United States Patent [19]

Charon et al.

[11] 4,434,255
[45] Feb. 28, 1984

[54] METHOD OF UTILIZING GLASS FIBERS IN COMPOSITE GASKET STRUCTURES

[75] Inventors: Clarence W. Charon, Newark; Kenneth E. Reid, Columbus, both of Ohio

[73] Assignee: Owens-Corning Fiberglas Corporation, Toledo, Ohio

[21] Appl. No.: 370,654

[22] Filed: Apr. 21, 1982

[51] Int. Cl.³ .............................................. C08K 9/10
[52] U.S. Cl. ..................................... 523/209; 524/447
[58] Field of Search ......................... 523/209; 524/447

[56] References Cited

U.S. PATENT DOCUMENTS

| | | | |
|---|---|---|---|
| 2,531,396 | 3/1947 | Carter et al. | 524/447 |
| 3,736,285 | 5/1973 | Miller et al. | 524/447 |
| 3,793,244 | 2/1974 | Megee et al. | 524/447 |
| 4,240,936 | 12/1980 | Henning | 524/447 |
| 4,260,534 | 4/1981 | Hanson et al. | 524/447 |

*Primary Examiner*—Joseph L. Schofer
*Assistant Examiner*—N. Sarofim
*Attorney, Agent, or Firm*—Ronald C. Hudgens; Greg Dziegielewski; Philip R. Cloutier

[57] ABSTRACT

A method of producing sheet material consisting of clay, glass fibers and a latex resin and the product produced thereby.

1 Claim, No Drawings

METHOD OF UTILIZING GLASS FIBERS IN COMPOSITE GASKET STRUCTURES

TECHNICAL FIELD

This invention pertains to a method of producing glass-containing sheet.

In one of its more specific aspects, this invention pertains to a method of producing glass-containing gasketing material.

Methods of making gasketing materials are well known. In general, the methods involve the basic step of depositing a latex, an asbestos or some fibrous material by employing alum to facilitate the deposition. However, with a decrease in the use of asbestos, glass and other fibrous materials have been substituted for the asbestos. This substitution, however, has resulted in processing difficulties inasmuch as the glass fibers tend to destroy the mobility of the system in that the latex becomes attached to the glass to form undesirable lumps.

STATEMENT OF THE INVENTION

There has now been discovered a method of producing gasketing material comprising latex, which method comprises forming a first aqueous mixture consisting of clay and a latex resin and encapsulating the clay particles in the latex. This first mixture is mixed with a second aqueous mixture consisting of glass fibers to form a third mixture from which water is separated to produce a uniform glass-containing sheet. One or both of the mixtures will contain a small quantity of surfactant.

In the best mode for carrying out the process, a first preliminary mixture consisting of clay, water, a latex resin and a surfactant is prepared and added to a second preliminary mixture consisting of water, a surfactant and glass fibers to form an aqueous mixture. The pH adjustments are made at various steps to insure encapsulation of the clay particles in the latex.

Any suitable clay conventionally employed in gasket production can be employed, such as Huber Co. Kaolex F for Engelhard ASP Series. Both are kaolin type clays having a particle size of about 0.55 microns and a pH of less than about 7. The clay will comprise from about 10 to about 70 weight percent of the dried sheet material.

Any suitable glass fibers can be employed. Preferably, the fibers will be textile chopped DE fibers from about ⅛ to about ½ inch in length. The glass fibers will comprise from about 1 to about 20 weight percent of the dried sheet material.

Any suitable surfactant can be employed. One particularly suitable surfactant is Katapol VP-532, a cationic surfactant available from the GAF Corporation, New York, N.Y. The surfactant will comprise about 0.2 weight percent of the composition.

Any suitable latex resin can be employed. Preferably, the latex resin will be a nitrile butyl resin, a styrene butyl rubber or an acrylic-based latex of any molecular weight. The latex resin will comprise from about 5 to about 50 weight percent of the dried sheet material.

Should a coloring agent be desired in the final composition, it will preferably be included in the first preliminary mixture. The surfactant can be incorporated in the final material by including it in either the first or second preliminary mixture, or in both.

In the preferred embodiment of the invention, the sheet material will consist of about 52.5 weight percent clay, about 17.5 weight percent glass, about 29.8 weight percent resin, and about 0.2 weight percent surfactant.

DETAILED DESCRIPTION

The method of this invention is demonstrated by the following example.

A first preliminary mixture was prepared by introducing 12,000 gallons of water, 1 gallon of a surfactant and 2 pounds of carbon black, as an optional colorant, into a hydropulper. After thorough mixing, there were introduced into the hydropulper 1500 lbs. particulate clay and 204 gallons of latex (46% solids). After mixing, alum solution was added until the mixture cleared, at which point the pH of the mixture was about 4.5. The mixture was dropped into a dump chest where ammonium hydroxide was added until the pH was just over 8.

A second mixture was then prepared by adding 1 gallon of surfactant to 12,000 gallons of water. The pH of the resultant mixture was adjusted to just over 8 with ammonium hydroxide. Into this mixture were then dispersed 500 pounds of glass fibers (DE 1/8 636).

This second mixture was then added to the first mixture to form a third mixture which was transferred to press rolls where the water was removed prior to routing to driers and cutters, the water first being drained from the suspension to form a damp sheet which was pressed at 500 psi and dried on a paper dryer to form the sheets suitable for gaskets. The finished gasket material contained, in percent by weight, about 17.5% glass, about 52.5% clay, about 29.8% latex, and about 0.2 weight percent surfactant.

The invention permits latex depositions in non-asbestos glass fiber slurries without the aid of cellulosic materials to prevent flocculation of the glass fibers. As a result, there results a slurry absent non-fiber agglomeration, the slurry having sufficient mobility for casting smooth sheets with a high degree of homogenity.

In the absence of asbestos in the present invention, new deposition sites must be employed to receive the latex. Cellulose is well known in the art; however, cellulose is detrimental to automotive gasketing applications and deposition of glass fibers have a tendency to result in an uncontrolled, uneven fiber distribution in sheet formation. For this reason, glass fibers have not been favored for non-asbestos gaskets.

The invention utilizes and permits high percentages of clay to receive the latex. The deposition of the latex on the clay is regulated by slowly adjusting the pH to 4.5 and by the addition of the surfactant. This results in a fine latex encapsulation of all the clay particles which resist particle agglomeration because of the presence of the surfactant. The clay-latex particle mobility is preserved and this allows the glass fibers to disperse evenly throughout the slurry and the slurry to maintain homogenity from its formation to the sheet forming process. Subsequent wet pressing forces the latex-coated clay through the surfactant film to yield a cohesive mass and handable sheet for further processing to gasket stock.

It will be evident from the foregoing that various modifications can be made to the method of this invention. Such, however, are considered within the scope of the invention.

We claim:

1. A method of producing a sheet material consisting of clay, glass fibers and a latex resin which comprises:
   a. forming a slurry of particulate clay, a latex resin and a surfactant;

b. adjusting the pH of said slurry to form a second slurry and to encapsulate the clay in the resin and in an outer film of the surfactant;

c. adding glass fibers to the second slurry to form a third slurry; and, d. pressing said third slurry to force said clay through said latex and said film of surfactant to produce a cohesive sheet.

* * * * *